(12) United States Patent
Yu et al.

(10) Patent No.: US 11,948,400 B2
(45) Date of Patent: Apr. 2, 2024

(54) ACTION DETECTION METHOD BASED ON HUMAN SKELETON FEATURE AND STORAGE MEDIUM

(71) Applicant: HUAZHONG UNIVERSITY OF SCIENCE AND TECHNOLOGY, Hubei (CN)

(72) Inventors: Li Yu, Hubei (CN); Han Yu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/344,877

(22) Filed: Jun. 30, 2023

(65) Prior Publication Data
US 2024/0021019 A1    Jan. 18, 2024

(30) Foreign Application Priority Data

Jul. 12, 2022  (CN) ......................... 202210812319.9

(51) Int. Cl.
| | |
|---|---|
| *G06V 40/20* | (2022.01) |
| *G06T 7/246* | (2017.01) |
| *G06T 7/277* | (2017.01) |
| *G06V 10/46* | (2022.01) |
| *G06V 10/82* | (2022.01) |
| *G06V 20/40* | (2022.01) |
| *G06V 20/52* | (2022.01) |
| *G08B 21/04* | (2006.01) |

(52) U.S. Cl.
CPC .............. *G06V 40/23* (2022.01); *G06T 7/248* (2017.01); *G06T 7/277* (2017.01); *G06V 10/462* (2022.01); *G06V 10/82* (2022.01); *G06V 20/46* (2022.01); *G06V 20/52* (2022.01); *G08B 21/043* (2013.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2018/0047175 A1* | 2/2018 | Wang | G06V 20/64 |
| 2020/0211154 A1* | 7/2020 | Ng | A61B 5/1128 |

(Continued)

*Primary Examiner* — Delomia L Gilliard
(74) *Attorney, Agent, or Firm* — JCIPRNET

(57) ABSTRACT

An action detection method based on a human skeleton feature and a storage medium belong to the field of computer vision, and the method includes: for each person, extracting a series of body keypoints in every frame of the video as the human skeleton feature; calculating a body structure center point and approximating rigid motion area by using the human skeleton feature as a calculated value from the skeleton feature state, and predicting an estimated value in the next frame; performing target matching according to the estimated and calculated value, correlating the human skeleton feature belonging to the same target to obtain a skeleton feature sequence, and then correlating features of each keypoint in the temporal domain to obtain a spatial-temporal domain skeleton feature; inputting the skeleton feature into an action detection model to obtain an action category. In the disclosure, the accuracy of action detection is improved.

9 Claims, 3 Drawing Sheets

(56) References Cited

U.S. PATENT DOCUMENTS

| | | | |
|---|---|---|---|
| 2022/0066544 A1* | 3/2022 | Kwon | G06T 7/20 |
| 2022/0301351 A1* | 9/2022 | Zhao | H04N 5/783 |
| 2022/0331028 A1* | 10/2022 | Sternitzke | A61B 5/1176 |
| 2023/0008567 A1* | 1/2023 | Zikos | G06V 10/82 |
| 2023/0186684 A1* | 6/2023 | Qiu | G06V 40/23 |
| | | | 382/103 |

* cited by examiner

ACTION DETECTION METHOD BASED ON HUMAN SKELETON FEATURE AND STORAGE MEDIUM

CROSS-REFERENCE TO RELATED APPLICATION

This application claims the priority benefit of China application serial no. 202210812319.9, filed on Jul. 12, 2022. The entirety of the above-mentioned patent application is hereby incorporated by reference herein and made a part of this specification.

BACKGROUND

Technical Field

The disclosure relates to the field of computer vision technology and, in particular, relates to an action detection method based on a human skeleton feature and a storage medium.

Description of Related Art

With the accelerated pace of population aging, the elderly monitoring for safety has become an important issue for the society. Accidental falling is one of the key causes of accidental death in the elderly. If the detection of falls can be timely, it can potentially save the lives of elderly individuals. In recent years, thanks to the widespread use of network cameras, through the network, people can remotely see the movements and activities of the elderly. However, it is still impractical to monitor the movements and activities of the elderly in real time only through manual means only. That is because for dangerous actions such as falling, if the falling can be noticed as early as possible, the elderly can be saved in time. Therefore, in order to avoid the occurrence of accidents as much as possible, it is necessary to provide an effective action detection method for real-time monitoring of dangerous actions such as falling for the safety of the elderly.

The conventional action detection methods are implemented based on the deployment of wearable sensors or environmental sensors, but these methods provide poor noise immunity and can only be applied in a limited range. With the rapid popularization of smart terminal devices, video-based action detection methods have gradually become mainstream in the field. Further, the development of deep learning-related technologies has also provided great help for the automatic analysis and processing of video data.

In the design of the currently-available action detection methods, optical flow features are extensively employed as a means of representing object motion information in videos. Nevertheless, obtaining optical flow features requires a significant amount of computing and storage resources. As a result, it becomes challenging for this type of design to meet the real-time requirements that are crucial in practical application scenarios for action detection methods. In the field of computer vision technology, with the development of human pose estimation technology, new ideas have surfaced for the design of efficient action detection methods. Different from the conventional action detection methods based on optical flow features, the action detection methods based on keypoints require only a small amount of data and need low computational costs. Further, the applicability and real-time performance of action detection are greatly enhanced by eliminating the need for manually labeled data during training.

However, the skeleton feature of human extracted by human pose estimation contains only several keypoints. As less feature information is provided and the expression ability is weak, the final action detection accuracy is unfavorable most of the time. In addition, in a multi-target monitoring scenario, in order to detect the actions of different people, it is necessary to match the same person between video frames. However, different keypoints in the human skeleton feature have different motion ranges. If the person matching is performed directly based on the human skeleton feature, the matching result will be affected by motion noise, and the final action detection accuracy will also be affected.

SUMMARY

In view of the above defects and requirements for improvements found in the related art, the disclosure provides an action detection method based on a human skeleton feature and a storage medium aiming to improve the accuracy of action detection in a multi-person scenario.

To achieve the above, in an aspect of the disclosure, the disclosure provides an action detection method based on a human skeleton feature, and the method includes the following steps. In (S1), a series of keypoints representing the skeleton feature of each target person is extracted from each frame in the provided video stream. In (S2), for each target person in each frame image, a center point of the human structure and an approximate area of rigid motion are calculated by using the human skeleton feature as a calculated value from the skeleton feature state. The center point of the human structure and the approximate area of rigid motion for each target person in the next adjacent frame are estimated according to the calculated value in each frame as an estimated value from the skeleton feature state. The center point of the human structure and the approximate area of rigid motion are, respectively, the average coordinate point and the minimum bounding rectangle of the keypoints. These keypoints exhibit a motion amplitude between frames that is lower than a predetermined threshold in the human skeleton feature. In (S3), target matching is performed according to the estimated value and the calculated value from the skeleton feature state of each frame image, the human skeleton feature belonging to the same target person in each frame image is correlated based on a matching result to obtain a skeleton feature sequence of each target person, and features of each keypoint in the skeleton feature sequence are correlated in a temporal domain to obtain a spatial-temporal domain skeleton feature. In (S4), the spatial-temporal domain skeleton feature of the target person is inputted into a trained action detection model to obtain a corresponding action category. The action detection model is a deep learning model, which takes the spatial-temporal domain skeleton feature of the target person as input and is used to predict the corresponding action category.

Further, in the human skeleton feature, the keypoints that exhibit motion amplitudes below a predetermined threshold are retained after removing the keypoints identified as belonging to a motion noise list. The motion noise list includes the left elbow, right elbow, left wrist, right wrist, left knee, right knee, left ankle, and right ankle.

Further, step (S2) includes the following. A spatial feature is calculated for the neighborhood surrounding each keypoint of each target person in every frame image. Further, in step (S3), the spatial-temporal domain skeleton feature of each target person includes the spatial feature of the neighborhood of each keypoint.

Further, the spatial feature is a SIFT feature.

Further, step (S3) includes the following. The keypoints in the human skeleton feature are divided to obtain a plurality of divided groups. The keypoints in each divided group are correlated to each other in space and motion.

Further, the action detection model is a graph convolutional neural network model.

Further, in step (S2), the estimation of the center point of the human structure and the approximate area of rigid motion of each target person in the next adjacent frame, based on the calculated skeleton feature state value for each target person in each frame, is accomplished using a Kalman filter.

Further, in step (S3), an algorithm used in performing target matching according to the estimated value and the calculated value from the skeleton feature state of each frame image is the Hungarian matching algorithm.

Further, step (S4) includes the following. An early warning message is sent if the detected action category is falling.

According to another aspect of the disclosure, the disclosure further provides a computer-readable storage medium including a stored computer program. When a processor executes the computer program, the computer program controls an apparatus where the computer-readable storage medium is located to execute the action detection method based on the human skeleton feature provided by the disclosure.

In general, the above technical solutions provided by the disclosure have the following beneficial effects: (1) In the disclosure, for the inputted video stream, the skeleton feature of the target person in each frame image is extracted, and the action detection is completed based on the human skeleton feature. Since the skeleton feature can well encode the structural information of the body and is not affected by factors such as illumination and clothing in the image, it exhibits improved robustness. Since the human skeleton feature has a sparser structure than the optical flow feature, the efficiency of action detection can be effectively improved. In the disclosure, when matching of the same person between video frames is performed, the keypoints with a relatively large motion range between frames are removed first, and the center point of the human structure and the approximate area of rigid motion are calculated with the use of the keypoints whose motion range is relatively stable between video frames. Further, based on the calculated center point of the human structure and the approximate area of rigid motion, the interference of motion noise in the process of person matching is effectively reduced, the accuracy of target matching is increased, and the accuracy of action detection in a multi-person scenario is effectively improved in this way.

(2) In the disclosure, after the human skeleton feature is extracted, the spatial feature of each keypoint neighborhood is calculated. This spatial feature is used as the input of the action detection model together with the spatial-temporal domain skeleton feature of the target person. The spatial feature also contains certain human structure information. Therefore, compared to a conventional action detection method based on the human skeleton feature, in the disclosure, the input of the model includes increased feature information, so that the accuracy of the result of action detection outputted by the model is effectively improved.

(3) Due to the structural features of the human body, some keypoints are related in space and motion. Based on this feature, in the disclosure, the keypoints are divided into multiple division groups in the human skeleton feature. In this way, the obtained spatial-temporal domain skeleton feature contains both the spatial and motion related information of the keypoint, so that the features inputted to the action detection model are further enriched, and that the accuracy of action detection is improved.

(4) In some preferred solutions of the disclosure, the Kalman filter is used to estimate the center point of the human structure and the approximate area of rigid motion for each target person in the next adjacent frame, and the Hungarian matching algorithm is used to match the target person. In the action detection of a multi-person scenario, improved calculation accuracy is provided, and each algorithm is a lightweight algorithm, so calculation efficiency is effectively improved.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention. In addition, the technical features involved in the various embodiments of the invention described below can be combined with each other as long as the technical features do not conflict with each other.

In the disclosure, the terms "first", "second", and the like (if any) in the disclosure and the accompanying drawings are used to distinguish similar objects, and are not necessarily used to describe a specific order or sequence.

In order to solve the technical problem of low accuracy of action detection in a multi-person scenario due to the interference of motion noise in an action detection method based on a human skeleton feature provided by the related art, the disclosure provides an action detection method based on a human skeleton feature and a storage medium. The overall idea is illustrated as follows. When the same person between frames is matched, keypoints with a large motion range between frames are removed from a human skeleton feature to reduce the interference of motion noise. The remaining keypoints are used to calculate a center point of the human structure and an approximate area of rigid motion as the basis for matching the same person between frames. In this way, the matching accuracy is improved, and the accuracy of action detection in a multi-person scenario is further enhanced. Based on the above, by adding a spatial feature of a neighborhood of the keypoints and the structural correlation information between the keypoints to the input of the action detection model, the information content of the features inputted to the model is enriched, and the accuracy of the action detection results outputted by the model is further improved.

Figure 1:
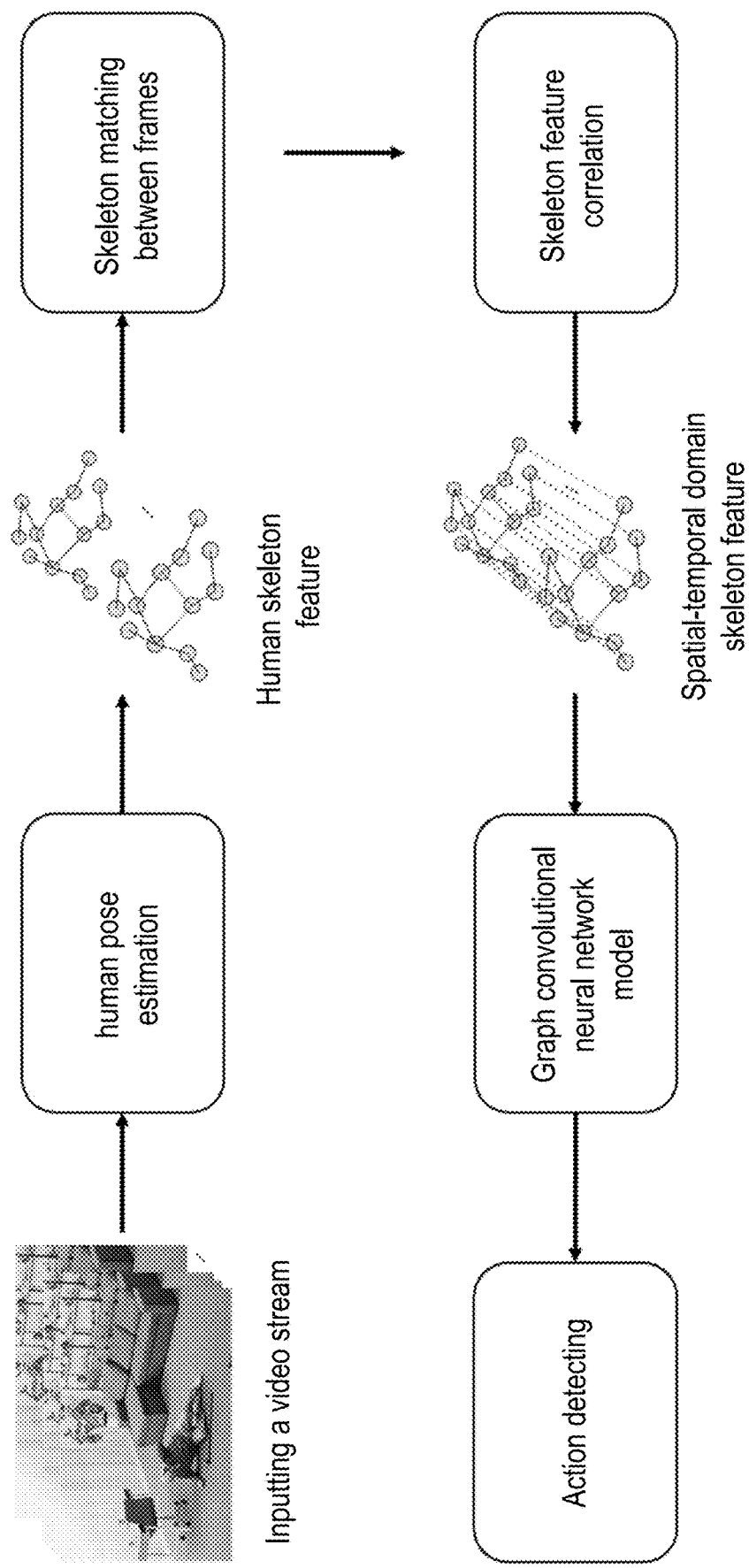
FIG. 1 is an action detection method based on a human skeleton feature provided by an embodiment of the disclosure.

Embodiments are provided as follows:

Embodiment 1, an action detection method based on a human skeleton feature is provided, and as shown in FIG. 1, the method includes the following steps. In (S1), a series of keypoints representing the human skeleton feature of each target person is extracted from each frame image in the provided video stream. In this embodiment, the inputted video stream includes 30 frame images.

In this embodiment, any human pose estimation method can be used to extract the human skeleton feature of the target person in each frame image in the inputted video stream. As an optional implementation manner, in this embodiment, a trained human pose estimation model is specifically used to extract the human skeleton feature. The model is a convolutional neural network trained on the Microsoft COCO dataset. Therefore, the human skeleton feature is formed by 17 keypoints defined in the dataset, and as shown in FIG. 2, the keypoints include the left eye, right eye, left ear, right ear, nose, left shoulder, right shoulder, left elbow, right elbow, left wrist, right wrist, left hip, right hip, left knee, right knee, left ankle, and right ankle.

In (S2), for each target person in each frame image, a center point of the human structure and an approximate area of rigid motion are calculated by using the human skeleton feature as a calculated value from the skeleton feature state, and the center point of the human structure and the approximate area of rigid motion for each target person in the next adjacent frame are estimated according to the calculated value as an estimated value from the skeleton feature state. The center point of the human structure and the approximate area of rigid motion are, respectively, the average coordinate point and the minimum bounding rectangle of the keypoints. These keypoints have a motion amplitude between frames that is less than a predetermined threshold in the human skeleton feature.

Considering that different keypoints have different motion ranges between frames, based on a human feature and motion characteristics of each keypoint when the human body is in motion, the keypoints are divided into two parts in this embodiment. One of the parts includes the keypoints with a relatively stable motion range between frames, including the left eye, right eye, left ear, right ear, nose, left shoulder, right shoulder, left hip, and right hip. The other part is the keypoints with a relatively large motion range between frames, including the left elbow, right elbow, left wrist, right wrist, left knee, right knee, left ankle, and right ankle. This part of the keypoints contains motion noise, and the motion noise may affect the accuracy of matching the same person between video frames.

Figure 2:
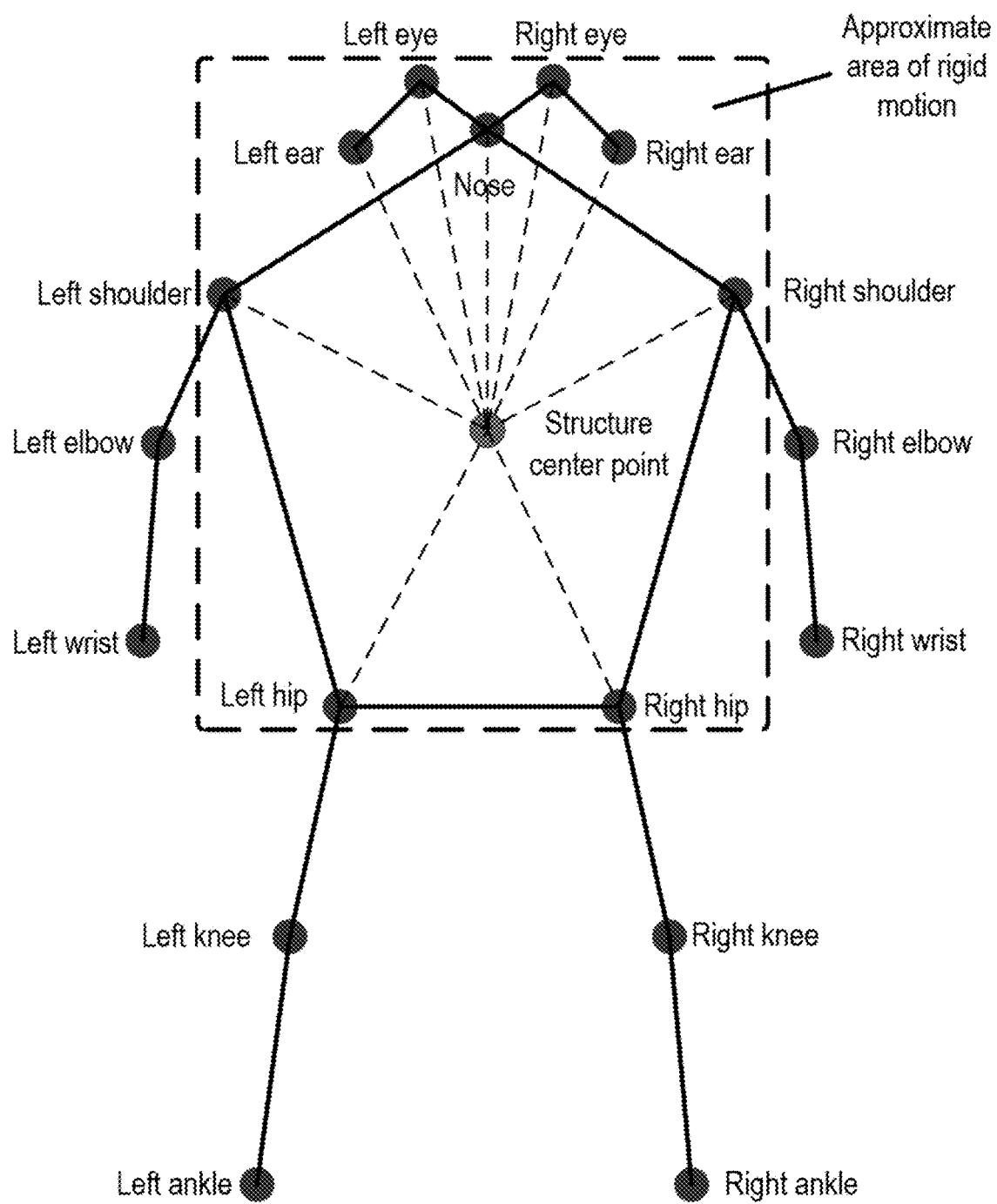
FIG. 2 is a human structure center point and an approximate area of rigid motion provided by an embodiment of the disclosure.

In this embodiment, for a target person, the calculated center point of the human structure and the approximate area of rigid motion are shown in FIG. 2.

Considering that the human skeleton feature extracted by human pose estimation only contains the position information of several keypoints, the amount of features is small. In this embodiment, after the human skeleton feature is extracted, a spatial feature of a neighborhood of each keypoint is calculated, and the spatial feature is treated as input of an action detection model together with the human skeleton feature. In this embodiment, the extracted spatial feature is a SIFT feature.

Figure 3:
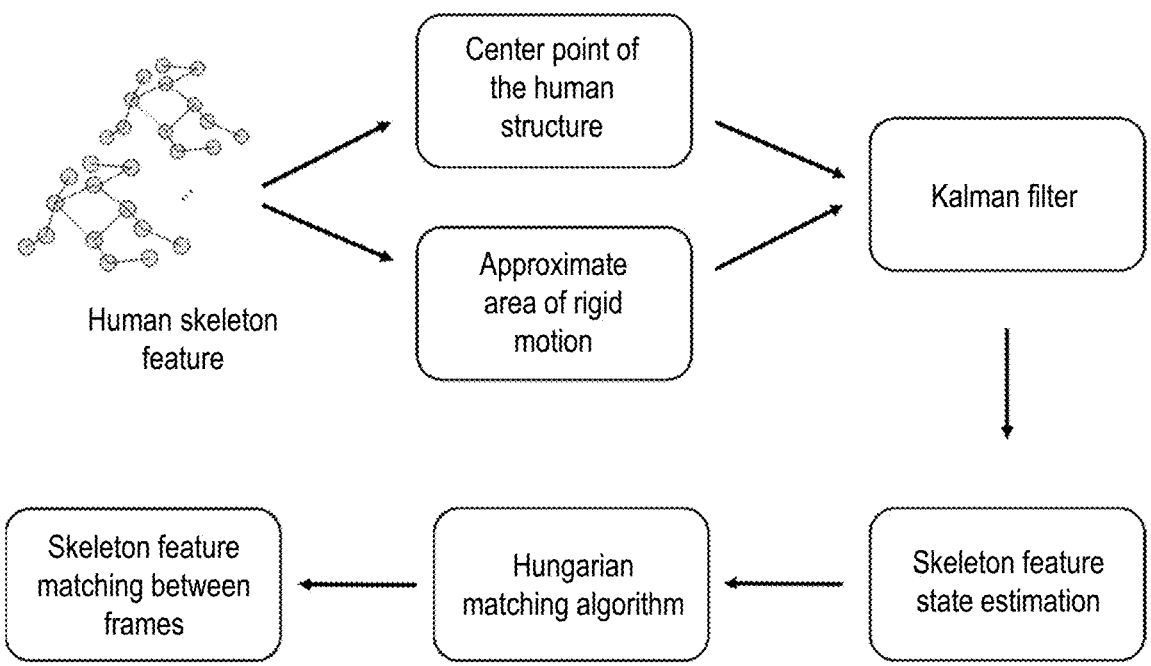
FIG. 3 is a schematic diagram of matching of a same person between video frames provided by an embodiment of the disclosure.

In practical applications, the skeleton feature state can be estimated based on a equation of motion state. In order to efficiently and accurately obtain the estimated value from the skeleton feature state, as shown in FIG. 3, in this embodiment, a Kalman filter is specifically used to estimate the center point of the human structure and the approximate area of rigid motion of each target person in the next frame image. The equation of motion state is constructed in the Kalman filter, and the difference between the estimated and calculated results is used to optimize the equation continuously. During the estimation process, the center point of the human structure is represented by its coordinates, and the approximate area of rigid motion is represented by its aspect ratio, width, and height.

In (S3), target matching is performed according to the estimated value and the calculated value from the skeleton feature state of each frame image, the human skeleton features belonging to the same target person in each frame image are correlated based on a matching result to obtain a skeleton feature sequence of each target person, and features of each keypoint in the skeleton feature sequence are correlated in a temporal domain to obtain a spatial-temporal domain skeleton feature.

The estimated value from the skeleton feature state in one frame image contains the corresponding relationship between this frame and the target person in the previous image. Therefore, by matching the calculated value and the estimated value from the skeleton feature state, the person matching between two adjacent frames may be achieved.

In this embodiment, the process of matching the same person is performed, as shown in FIG. 3. In order to complete the matching efficiently and accurately between the calculated value and the estimated value from the skeleton feature state to achieve the matching of the same target person between video frames, as shown in FIG. 3, in this embodiment, the Hungarian matching algorithm is specifically used to complete the matching between the calculated value and the estimated value from the skeleton feature state.

In order to enrich the amount of information of the inputted features of the action detection model, in this embodiment, the obtained spatial-temporal domain skeleton feature includes not only the keypoints with the established temporal domain correlation, but also the SIFT feature of the neighborhood of each keypoint.

Figure 4:
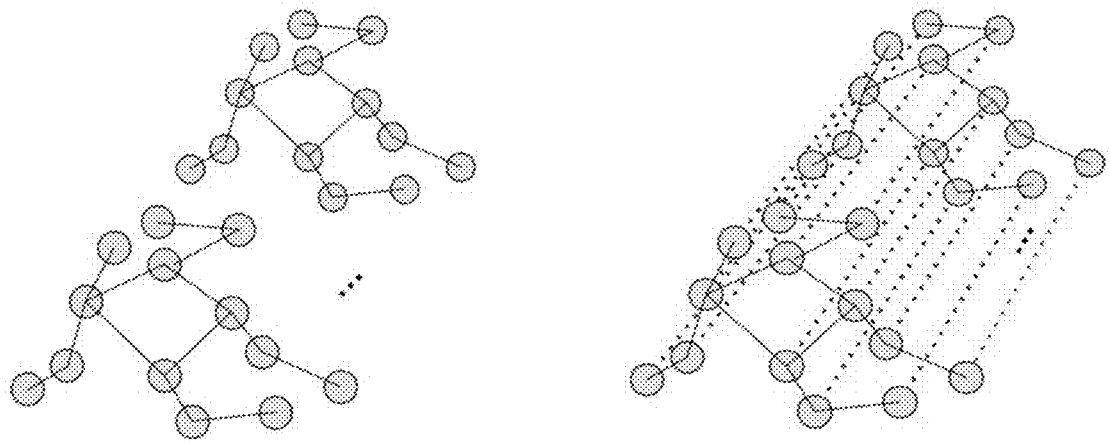
FIG. 4 is a schematic diagram of a human skeleton feature and a spatial-temporal domain skeleton feature provided by an embodiment of the disclosure.

In order to further enrich the amount of information of the inputted features of the action detection model, step (S3) of this embodiment further includes the following. The keypoints in the human skeleton feature are divided to obtain a plurality of divided groups. The keypoints in each divided group are correlated to each other in space and motion. In this way, the model input also includes the spatial correlation information of the keypoints. FIG. 4 is an example of obtaining a spatial-temporal domain skeleton feature according to a human skeleton feature. The human skeleton feature is on the left, and the spatial-temporal domain skeleton feature is on the right. In this embodiment, the length of the human skeleton feature sequence is fixed at 30.

In (S4), the spatial-temporal domain skeleton feature of the target person is inputted into a trained action detection model to obtain a corresponding action category. The action detection model is a deep learning model, which takes the spatial-temporal domain skeleton feature of the target person as input and is used to predict the corresponding action category.

As an optional implementation manner, in this embodiment, the action detection model used is specifically a graph convolutional neural network. Herein, the number of points in the graph structure remains the same as the number of keypoints in the human skeleton feature, which is 17 in this embodiment. The action detection model receives the spatial-temporal domain skeleton feature of the target person from the inputted video stream. In the graph convolution operation, the weights are assigned based on the form of division of adjacency subsets, and the specific process is as follows. During the graph convolution operation, the center point of the operation is mapped to one subset, while the points adjacent to this subset in space are mapped to another subset. Different weights are assigned based on the specific subsets, enabling differentiated processing within the operation. Ultimately, the model outputs the action category of the target person in the video stream, such as sitting, falling, etc.

It is easy to understand that after the graph convolutional neural network is built, by using the video stream of the known person action category and following the above steps (S1) to (S3) to obtain the spatial-temporal domain skeleton feature of each task target, the corresponding dataset can be constructed. After the dataset is used to train the graph convolutional neural network, the action detection model may be obtained.

In video monitoring scenarios such as health monitoring, safety monitoring, kindergarten monitoring, and nursing home monitoring, falling is an action that needs to be noticed in time, so in consideration of the above, in this embodiment, step (S4) further includes the following. An early warning message is sent if the detected action category is falling.

Generally, in this embodiment, the person matching between frames is carried out based on the center point of the human structure and the approximate area of rigid motion. In this way, the problem of mismatching between human skeleton features in the matching process is overcome, and the performance of the method for detecting a falling action in a multi-person scenario is improved.

Embodiment 2, a computer-readable storage medium is provided, and the computer-readable storage medium includes a stored computer program. When the computer program is executed by a processor, the computer program controls an apparatus where the computer-readable storage medium is located to execute the action detection method based on the human skeleton feature according to Embodiment 1.

A person with ordinary skill in the art should easily understand that the above description is only the preferred embodiment of the disclosure and is not intended to limit the disclosure. Any modifications, equivalent replacements, and modifications made without departing from the spirit and principles of the disclosure should fall within the protection scope of the disclosure.

What is claimed is:

1. An action detection method based on a human skeleton feature, comprising:
   (S1) extracting a series of keypoints that represent the human skeleton feature of each target person from every frame image in the provided video stream;
   (S2) for each target person in each frame image, calculating, by using the human skeleton feature, the center point of the human structure and an approximate area of rigid motion, which serves as a calculated value from the skeleton feature state;
   estimating the center point of the human structure and an approximate area of rigid motion in the next adjacent frame according to the calculated value, which serves as an estimated value from the skeleton feature state; the center point of the human structure and the approximate area of rigid motion respectively are an average coordinate point and a minimum bounding rectangle of the keypoints whose motion amplitude between frames is less than a predetermined threshold in the human skeleton feature;
   (S3) performing target matching according to the estimated value and calculated value from the skeleton feature state of each frame image; correlating the human skeleton features belonging to the same target person in each frame image based on a matching result, which is used to generate a sequence of skeleton feature for each target person; correlating the features of each keypoint in the sequence of skeleton feature in the temporal domain, which is used to obtain a spatial-temporal domain skeleton feature;
   (S4) inputting the spatial-temporal domain skeleton feature of the target person into a trained action detection model to obtain a corresponding action category, the action detection model is a deep learning model, which takes the spatial-temporal domain skeleton feature of the target person as input and is used to predict the corresponding action category.

2. The action detection method based on the human skeleton feature according to claim 1, wherein in the human skeleton feature, the keypoints whose motion amplitude between frames is less than the predetermined threshold are the remaining keypoints after the keypoints belonging to a motion noise list are removed from the human skeleton feature, and the motion noise list comprises a left elbow, a right elbow, a left wrist, a right wrist, a left knee, a right knee, a left ankle, and a right ankle.

3. The action detection method based on the human skeleton feature according to claim 1, wherein step (S2) further comprises: calculating a spatial feature of a neighborhood of each keypoint for each target person in each frame image, wherein in step (S3), the spatial-temporal domain skeleton feature of each target person comprises the spatial feature of the neighborhood of each keypoint.

4. The action detection method based on the human skeleton feature according to claim 3, wherein the spatial feature is a SIFT feature.

5. The action detection method based on the human skeleton feature according to claim 1, wherein the action detection model is a graph convolutional neural network model.

6. The action detection method based on the human skeleton feature according to claim 1, wherein in step (S2), the estimating the center point of the human structure and the approximate area of rigid motion of each target person in the next adjacent frame according to the calculated value from the skeleton feature state of each target person in each frame is completed by a Kalman filter.

7. The action detection method based on the human skeleton feature according to claim 1, wherein in step (S3), an algorithm used in the performing target matching according to the estimated value and the calculated value from the skeleton feature state of each frame image is the Hungarian matching algorithm.

8. The action detection method based on the human skeleton feature according to claim 1, wherein step (S4) further comprises: sending an early warning message if the detected action category is falling.

9. A non-transitory computer-readable storage medium, comprising a stored computer program; the computer program controls an apparatus where the computer-readable storage medium is located to execute the action detection method based on the human skeleton feature according to claim 1 when being executed by a processor.

\* \* \* \* \*